(12) United States Patent
Tang

(10) Patent No.: US 7,996,958 B2
(45) Date of Patent: Aug. 16, 2011

(54) HINGE ASSEMBLY

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 330 days.

(21) Appl. No.: 12/268,513

(22) Filed: Nov. 11, 2008

(65) Prior Publication Data
US 2010/0037429 A1 Feb. 18, 2010

(30) Foreign Application Priority Data
Aug. 15, 2008 (CN) .......................... 2008 1 0303866

(51) Int. Cl.
*E05F 1/08* (2006.01)
*E05C 11/08* (2006.01)
(52) U.S. Cl. ................. 16/307; 16/299; 16/342
(58) Field of Classification Search ............. 016/307, 016/308, 342, 290, 299, 304, 303, 330, 50, 016/54
See application file for complete search history.

(56) References Cited

U.S. PATENT DOCUMENTS

| | | | | | |
|---|---|---|---|---|---|
| 1,956,040 | A | * | 4/1934 | Meyer | 16/340 |
| 1,960,505 | A | * | 5/1934 | Penfield | 16/341 |
| 3,566,434 | A | * | 3/1971 | Grinsteiner | 16/66 |
| 3,860,993 | A | * | 1/1975 | Matuska | 16/52 |
| 5,333,356 | A | * | 8/1994 | Katagiri | 16/340 |
| 5,382,108 | A | * | 1/1995 | Ojima | 403/120 |
| 5,584,100 | A | * | 12/1996 | Doyle et al. | 16/301 |
| 5,715,576 | A | * | 2/1998 | Liu | 16/342 |
| 5,971,472 | A | * | 10/1999 | Schreiter et al. | 296/217 |
| 6,061,874 | A | * | 5/2000 | Tatara | 16/285 |
| 6,817,061 | B2 | * | 11/2004 | Wu et al. | 16/308 |
| 7,228,596 | B2 | * | 6/2007 | Kang | 16/330 |
| 2002/0112319 | A1 | * | 8/2002 | Kida | 16/342 |

* cited by examiner

*Primary Examiner* — Chuck Y. Mah
(74) *Attorney, Agent, or Firm* — Clifford O. Chi

(57) ABSTRACT

A hinge assembly includes a resilient member and two rotary units. Each rotary unit includes a shaft, an outer tube, and an inner tube. The outer tubes are sleeved on the shafts correspondingly. The inner tubes are non-rotatably connected to the shafts and rotatably connected to the outer tubes. The resilient member is positioned between the rotary units, thus causing the inner tubes of the rotary units to resist the outer tubes.

11 Claims, 4 Drawing Sheets

HINGE ASSEMBLY

BACKGROUND

1. Field of the Invention

The present disclosure generally relates to hinge assemblies and, particularly, to a hinge assembly used in a foldable electronic device having a top cover and a main body.

2. Description of the Related Art

Foldable electronic devices, such as notebook computers, are popular for their portability. In the foldable electronic device, a cover is rotatably connected to a main body via a typical hinge assembly.

The typical hinge assembly often includes a shaft, a friction member fixed on the shaft, and a rotary member rotatably sleeved on the shaft. The rotary member and the shaft are fixed to the cover and the main body. The rotary member is capable of being positioned in any position relative to the friction member and the shaft because of friction created between the friction member and the rotary member. Thus, the cover can be opened to any angle relative to the main body, and remain in any position.

However, over time, the friction causes the engaging surfaces of the rotary member and the friction member to become abraded, resulting in little or no friction between the rotary member and the friction member. Thus, the cover would be incapable of remaining in any desired position. Therefore, the hinge assembly has a relatively short service life.

Therefore, a new hinge assembly is desired to overcome the above-described shortcomings.

SUMMARY

A hinge assembly includes a resilient member and two rotary units. Each rotary unit includes a shaft, an outer tube, and an inner tube. The outer tubes are sleeved on the shafts. The inner tubes are non-rotatably connected to the shafts and rotatably connected to the outer tubes. The resilient member is positioned between the rotary units causing the inner tubes of the rotary units to resist the outer tubes.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hinge assembly. Moreover, in the drawings, like reference numerals designate corresponding parts throughout several views, and all the views are schematic.

DETAILED DESCRIPTION OF THE EMBODIMENTS

Figure 1:
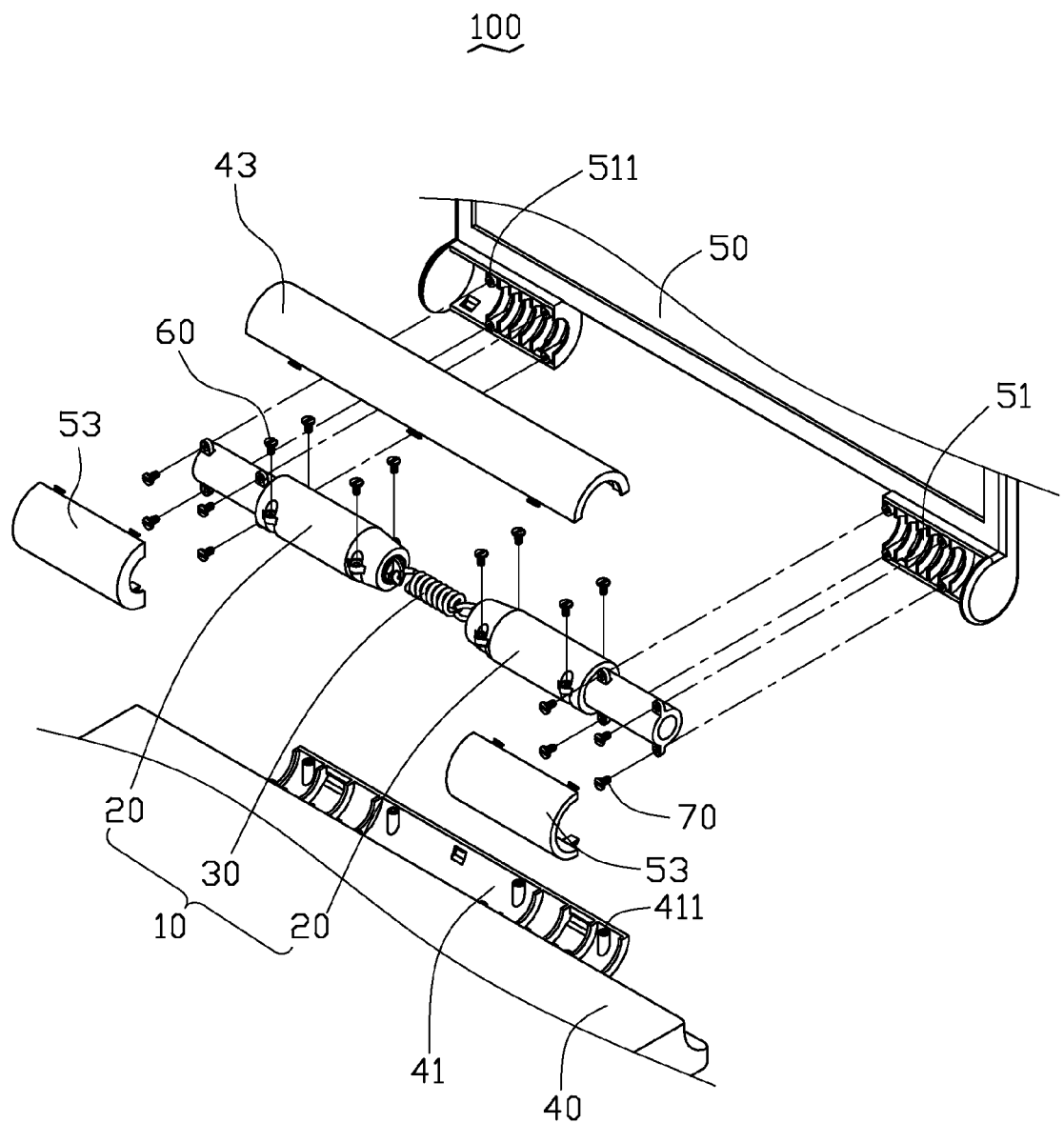
FIG. 1 is an assembled, isometric view of one embodiment of a hinge assembly, the hinge assembly shown attached to a main body and a cover of a foldable electronic device.

The present hinge assembly may be used in foldable electronic devices, such as notebook computers, cell phones, media players, and so on. Referring to FIG. 1, for the purposes of conveniently describing the present hinge assembly, one embodiment of a hinge assembly 10 as used in a notebook computer 100 is described and illustrated.

The notebook computer 100 includes a main body 40 and a cover 50. The main body 40 includes a first receiving portion 41 and a first coupling cover 43. The first receiving portion 41 is formed from an edge of the main body 40 and the first coupling cover 43 is configured to be coupled on the first receiving portion 41. The first receiving portion 41 defines a plurality of screw holes 411 therein. The cover 50 includes two second receiving portions 51 and two second coupling covers 53. The second receiving portions 51 are formed from an edge of the cover 50 and the second coupling covers 53 are configured for coupling on the second receiving portions 51. The second receiving portions 51 define a plurality of screw holes 511 therein. The hinge assembly 10 includes two rotary units 20 and a resilient member 30.

Figure 2:
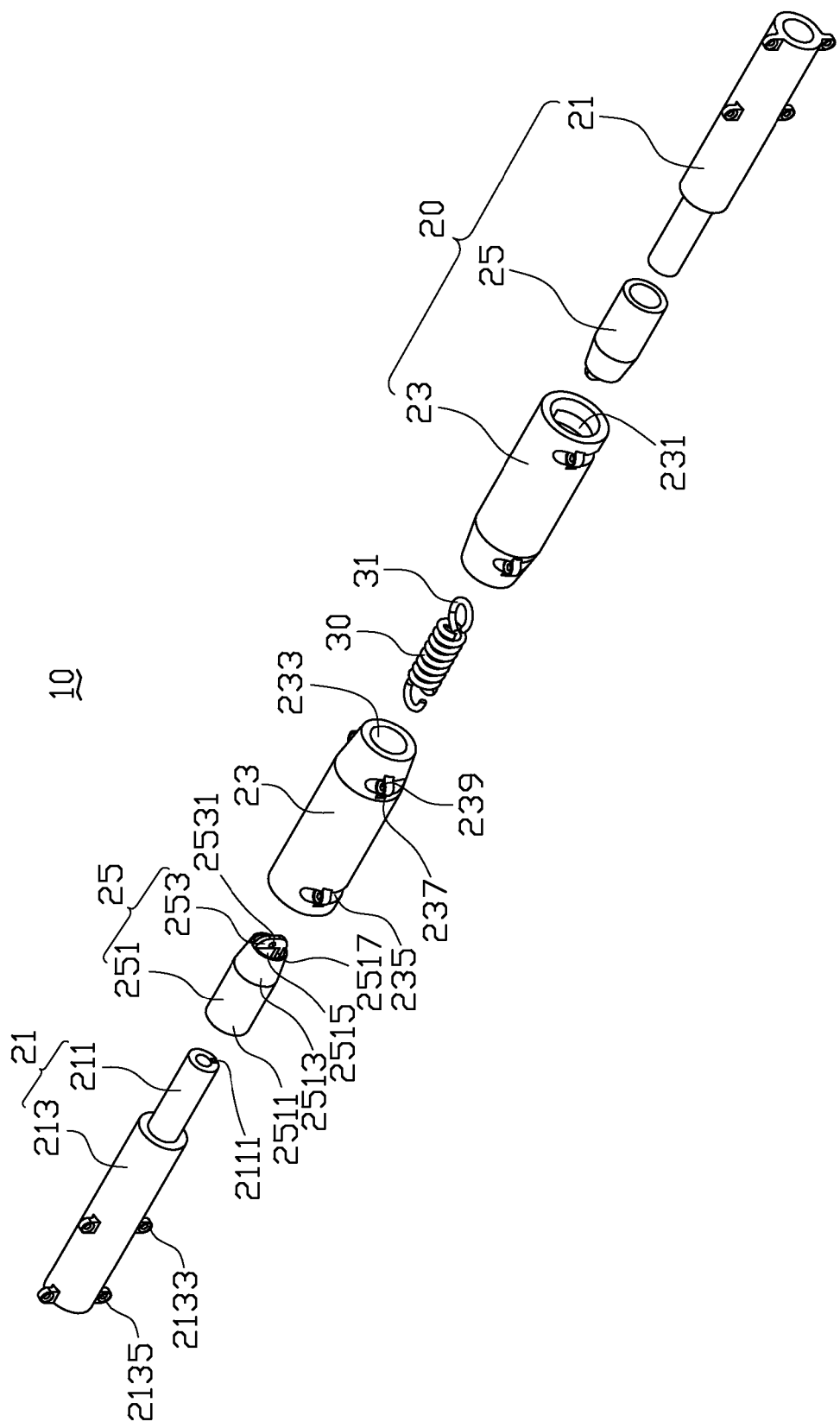
FIG. 2 is an exploded, isometric view of the hinge assembly of FIG. 1.
Figure 3:
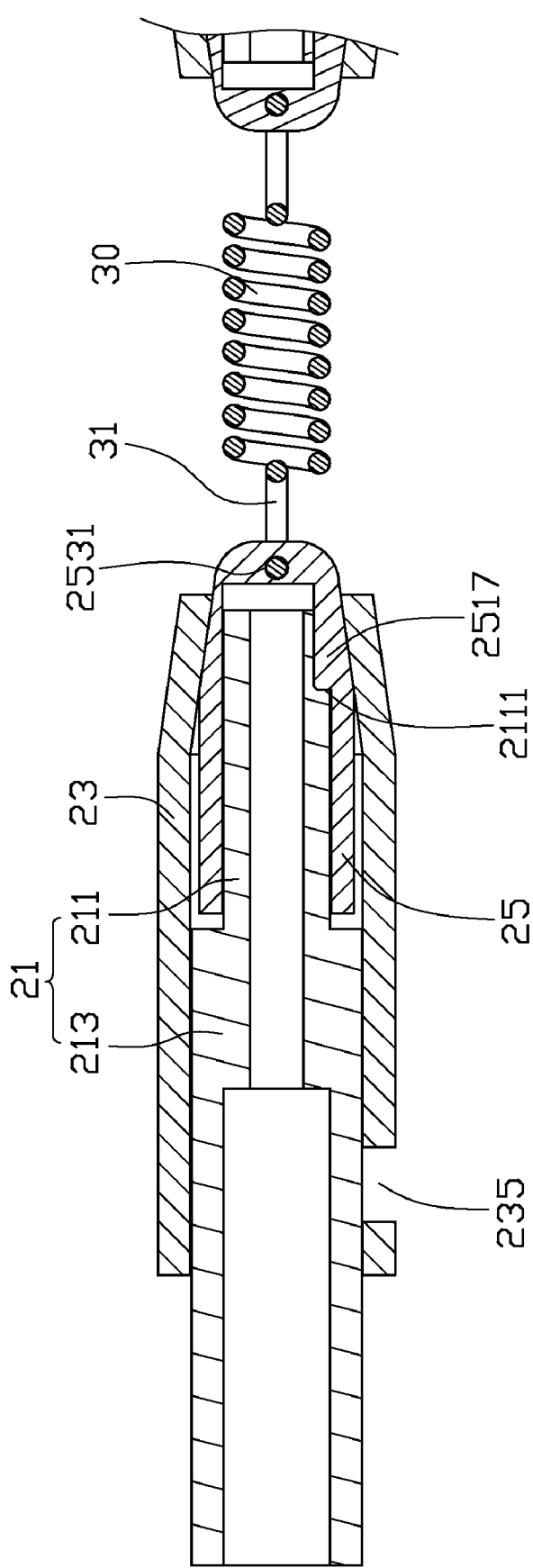
FIG. 3 is a partial, cross-sectional view of the hinge assembly of FIG. 1.

Referring to FIG. 2 and FIG. 3, each rotary unit 20 includes a shaft 21, an outer tube 23, and an inner tube 25.

The shaft 21 includes an engaging portion 211 and a connecting portion 213 connected to the engaging portion 211. The engaging portion 211 defines a latching slot 2111 at an end therein opposite to the connecting portion 213. The connecting portion 213 forms a plurality of connecting ears 2133. Each connecting ear 2133 defines a connecting hole 2135 in a center portion of the connecting ear 2133.

The outer tube 23 includes a hollow cylindrical portion (not labeled) defining a cylindrical first receptacle 231 therein and a hollow frustoconical portion (not labeled) defining a frustoconical second receptacle 233 therein. A larger end of the hollow frustoconical portion is connected to the hollow cylindrical portion. The outer tube 23 defines two angular slots 235 in the sidewall therein. A connecting ear 237 is formed at each end of each angular slot 235. Each connecting ear 237 defines a connecting hole 239 in a center portion therein. The first receptacle 231 has a diameter substantially the same as a diameter of the connecting portion 213 of the shaft 21. A diameter of the second receptacle 233 gradually decreases with increasing distance from the first receptacle 231.

The inner tube 25 includes a friction portion 251 and a joining portion 253. The friction portion 251 has a cylindrical receiving portion 2511 and a frustoconical resisting portion 2513. A hole 2515 is defined in a center portion of the friction portion 251. The receiving portion 2511 and the joining portion 253 are positioned at opposite ends of the resisting portion 2513. A latching protrusion 2517 is formed on an inner sidewall of the resisting portion 2513. A diameter of the center hole 2515 is substantially the same as a diameter of the engaging portion 211 of the shaft 21. A diameter of the resisting portion 2513 gradually decreases with increasing distance from the receiving portion 2511. The joining portion 253 is a sheet defining a joining hole 2531 in the center.

In the illustrated embodiment, the resilient member 30 is a helical, extension spring having two hooks 31 at opposite ends. The hooks 31 are configured for hooking in the joining holes 2531 of the inner tubes 25 to connect the two rotary units 20.

Figure 4:
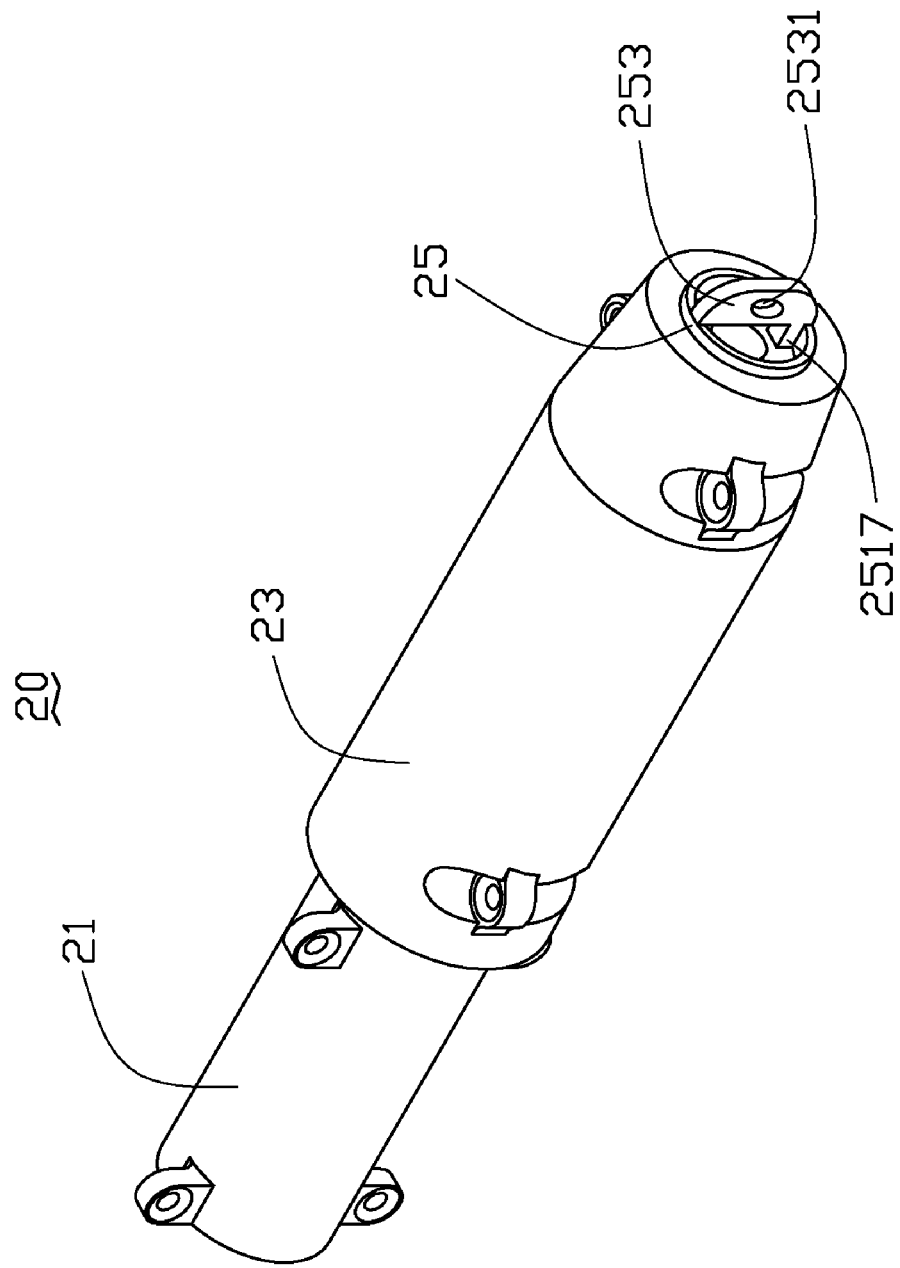
FIG. 4 is an assembled, isometric view of the hinge assembly of FIG. 1.

Referring to FIG. 3 and FIG. 4, the inner tube 25 is sleeved on the engaging portion 211 of the shaft 21. The latching protrusion 2517 engages in the latching slot 2111 of the shaft 21 to non-rotatably connect the inner tube 25 on the shaft 21. The outer tube 23 sleeves on the shaft 21 and the inner tube 25. The joining portion 253 protrudes out of the outer tube 23. The connecting portion 213 of the shaft 21 rotatably engages in the first receptacle 231 of the outer tuber 23. The resisting portion 2513 of the inner tube 25 touches the second receptacle 233 of the outer tube 23 forming the rotary unit 20.

After each rotary unit 20 is assembled, the hooks 31 of the resilient member 30 are hooked in the joining holes 2531 of the inner tubes 25 of the rotary units 20, thereby forming the hinge assembly 10.

When the hinge assembly 10 is applied in the notebook computer 100, the cover 50 is moved close to the main body 40 to position the first receiving portion 41 between the second receiving portions 51. The hinge assembly 10 is put in the first and second receiving portions 41, 51. A plurality of screws 60 are inserted in the connecting holes 239 of the outer tubes 23 and screwed in the screw holes 411 of the main body 40, thus fixing the outer tubes 23 to the main body 40. A plurality of screws 70 are inserted in the connecting holes 2135 of the shafts 21 and screwed in the screw holes 511 of the cover 50, thus fixing the shafts 21 to the cover 50. The resilient member 30 is extended to make the resisting portions 2513 of the inner tubes 25 resist the second receptacles 233 of the outer tubes 23. The first coupling cover 43 is coupled on the first receiving portion 41 and the second coupling covers 53 are coupled on the second receiving portions 53 to protect the hinge assembly 10 and for aesthetics.

The inner tubes 25 continuously resist the outer tubes 23 because of an elastic force created by the resilient member 30, even after the hinge assembly 10 has been used for a long period of time. Thus, the hinge assembly 10 has a long service life. In addition, the resilient member 30 is positioned outside the rotary units 20, so no space is needed in the rotary units 20 to receive the resilient member 30. Thus, the hinge assembly 10 has a small volume. In use, when the cover 50 is rotated to move relative to the main body 40, the outer tubes 23 are rotated relative to the shafts 21 and the inner tubes 25. Friction created between the inner tubes 25 and the outer tubes 23, retains the cover 50 in any position relative to the main body 40.

In another embodiment, the latching slot 2111 may be defined in the inner tube 25, and the latching protrusion 2515 may be formed on the shaft 21. In addition, the second receptacle 233 and the resisting portion 2513 may have a portion that is frustoconical shaped, as long as the inner tube 25 and the outer tube 23 are rotatable to and obliquely resist each other, such that when the resilient member 30 applies a force along an axial direction of the inner tube 25, a force oblique to the axis of the inner tube 25 is created between the inner tube 25 and the outer tube 23. Lastly, each shaft 21 and the corresponding inner tube 25 may be integrally formed.

In yet another embodiment, the outer tubes 23 may be non-rotatably connected to the shafts 21, the inner tubes 25 are rotatable relative to the shafts 21, and the resilient member 30 is a compression spring with two ends connected to the outer tubes 23. As such, an elastic force generated by the compressed resilient member 30 forcing the outer tubes 23 to move close to the inner tubes 25. Thus, friction is created between the outer tubes 23 and the inner tubes 25.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising:
a resilient member having two opposite ends; and
two rotary units, each rotary unit comprising:
a shaft adapted to be mounted to a first hinged member;
an outer tube sleeved on the shaft and adapted to be mounted to a second hinged member; and
an inner tube non-rotatably connected to the shaft and rotatably connected to the outer tube;
wherein the resilient member is positioned between the two rotary units and positioned outside the two rotary units, and the two opposite ends of the resilient member are respectively connected to the two inner tubes of the two rotary units, thereby causing the inner tubes of the rotary units to resist the outer tubes.

2. The hinge assembly of claim 1, wherein the outer tube comprises a first receptacle and a second receptacle defined at an end of the first receptacle, and the inner tube comprises a resisting portion for resisting the second receptacle.

3. The hinge assembly of claim 2, wherein the second receptacle of the outer tube is frustoconical shaped, and the resisting portion of the inner tube is frustoconical shaped.

4. The hinge assembly of claim 3, wherein the resilient member generates an elastic force causing the inner tubes to resist the outer tubes.

5. The hinge assembly of claim 4, wherein the inner tubes are received in the outer tubes; each inner tube forms a latching protrusion in the inner sidewall of the inner tube; each shaft defines a latching slot in the outer sidewall of the shaft; the latching protrusions of the inner tubes are engaged in the latching slots of the shaft to non-rotatably connect the shafts to the inner tubes.

6. The hinge assembly of claim 5, wherein each shaft comprises an engaging portion and a connecting portion connected to the engaging portion; the latching slot is defined at an end of the engaging portion opposite to the connecting portion; the engaging portions of the shafts engage in the inner tubes; a part of the connecting portions of the shafts engage in the first receptacles of the outer tubes.

7. The hinge assembly of claim 5, wherein each inner tube further comprises a joining portion protruding out of the corresponding outer tube; the resilient member comprises two hooks at two ends; the hooks are connected to the joining portions of the inner tubes.

8. A hinge assembly, comprising:
a resilient member having two opposite ends; and
two rotary units, each rotary unit comprising:
a shaft adapted to be mounted to a first hinged member;
an outer tube comprising a first receptacle defined therein and a second receptacle defined at one end of the first receptacle, the outer tube sleeved on the shaft and adapted to be mounted to a second hinged member; and
an inner tube rotatably received in the outer tube, and the inner tube comprising a resisting portion for resisting the second receptacle;
wherein the resilient member is connected between the rotary units away from the first and second receptacles of each rotary unit, thereby causing the inner tubes of the rotary units to resist the outer tubes.

9. The hinge assembly of claim 8, wherein the second receptacle of the outer tube is frustoconical shaped, and the resisting portion of the inner tube is frustoconical shaped.

10. The hinge assembly of claim 9, wherein the two opposite ends of the resilient member are connected to the inner tubes of the two rotary units; an elastic force from the resilient member causes the inner tubes to resist the outer tubes.

11. A hinge assembly, comprising;
a resilient member having two opposite ends; and
two rotary units, each rotary unit comprising:
a shaft adapted to be mounted to a first hinged member;
an outer tube comprising a first receptacle defined therein and a second receptacle defined at one end of the first receptacle, the outer tube sleeved on the shaft and adapted to be mounted to a second hinged member; and an inner tube rotatably received in the outer tube, and the inner tube comprising a resisting portion for resisting the second receptacle;

wherein the resilient member is connected between the rotary units away from the first and second receptacles of each rotary unit, and applies a force along an axial direction one the inner tube, thereby causing a force oblique to said axial direction between the inner tube and the outer tube.

* * * * *